United States Patent
Carlson et al.

(10) Patent No.: US 9,715,692 B1
(45) Date of Patent: Jul. 25, 2017

(54) SYSTEM FOR MANAGING BIDS FOR PAY-PER-CLICK SEARCH ENGINES

(75) Inventors: David Gilbert Carlson, Centennial, CO (US); Frank Wouter Watervoort, Castle Rock, CO (US)

(73) Assignee: Facebook, Inc., Menlo Park, CA (US)

( * ) Notice: Subject to any disclaimer, the term of this patent is extended or adjusted under 35 U.S.C. 154(b) by 2916 days.

(21) Appl. No.: 10/823,399

(22) Filed: Apr. 12, 2004

Related U.S. Application Data

(60) Provisional application No. 60/462,376, filed on Apr. 11, 2003.

(51) Int. Cl.
*G06Q 30/00* (2012.01)

(52) U.S. Cl.
CPC .................. *G06Q 30/00* (2013.01)

(58) Field of Classification Search
CPC ...................................... G06Q 10/00
USPC ...................................... 705/35–40
See application file for complete search history.

(56) References Cited

U.S. PATENT DOCUMENTS

| | | | |
|---|---|---|---|
| 6,269,361 B1* | 7/2001 | Davis et al. ........................ 707/3 |
| 7,043,471 B2* | 5/2006 | Cheung .................. G06Q 30/02 |
| 7,065,500 B2* | 6/2006 | Singh ................ G06F 17/30864 |
| | | | 705/20 |
| 7,181,438 B1* | 2/2007 | Szabo ................ G06F 17/30522 |
| 7,278,105 B1* | 10/2007 | Kitts ............................. 715/736 |
| 7,630,986 B1* | 12/2009 | Herz ........................ G06Q 10/10 |
| 7,792,698 B1* | 9/2010 | Veach et al. ................ 705/14.71 |
| 2002/0004735 A1* | 1/2002 | Gross ............................... 705/10 |
| 2002/0038242 A1* | 3/2002 | Amano et al. ................... 705/14 |
| 2002/0128959 A1* | 9/2002 | Kostic et al. .................... 705/37 |
| 2002/0169760 A1* | 11/2002 | Cheung et al. ..................... 707/3 |
| 2003/0023505 A1* | 1/2003 | Eglen et al. ..................... 705/26 |
| 2003/0130883 A1* | 7/2003 | Schroeder et al. ............. 705/10 |
| 2003/0149622 A1* | 8/2003 | Singh et al. ..................... 705/14 |
| 2003/0195837 A1* | 10/2003 | Kostic et al. .................... 705/37 |
| 2003/0229692 A1* | 12/2003 | Vo .................................. 709/224 |
| 2004/0010592 A1* | 1/2004 | Carver et al. ................. 709/226 |
| 2004/0043810 A1* | 3/2004 | Perlin et al. ..................... 463/16 |
| 2004/0103024 A1* | 5/2004 | Patel et al. ....................... 705/14 |

(Continued)

OTHER PUBLICATIONS

BidRank (TM) Plus User Guide Oct. 2, 2002 http://web.archive.org/web/20021002094359/www.bidrank.com/lib/bidright/bidrankplus.html.*

(Continued)

*Primary Examiner* — Bruce I Ebersman
(74) *Attorney, Agent, or Firm* — Fenwick & West LLP

(57) ABSTRACT

An Internet/world-wide-web based keyword bid management system that allows advertisers on pay-per-click search engines ("PPCSEs") to influence position (ranking) on said PPCSEs with the use of a rules based bidding engine. Keyword bid rules allow advertisers to influence desired rankings on PPCSEs based on time-of-day, competitor ranking, bid gaps, etc, or combination of said rules and allow advertisers to mimic human bidding behavior through an automated means. The system comprises of specialized software ("rules based bidding system") that is hosted by an ASP ("application service provider") so that all of the advertiser's interactions with said software can take place from any personal computer with Internet access and relatively recent Internet browser software without the requirement of having to download any additional software locally.

24 Claims, 5 Drawing Sheets

(56) References Cited

U.S. PATENT DOCUMENTS

| | | | |
|---|---|---|---|
| 2004/0167816 A1* | 8/2004 | Kamath ........................ | 705/14 |
| 2004/0199397 A1* | 10/2004 | Dresden ......................... | 705/1 |
| 2005/0065844 A1* | 3/2005 | Raj et al. ..................... | 705/14 |
| 2005/0246322 A1* | 11/2005 | Ravikumar et al. ............ | 707/3 |
| 2006/0026064 A1* | 2/2006 | Collins ......................... | 705/14 |

OTHER PUBLICATIONS

Metacrawler Parallel Web Search Service http://web.archive.org/web/19961111000856/www.metacrawler.com/index.html 1/4/2008.*

Optimal Bidding on Keywrod Auctions, Kitts and Leblanc Electronic Markets 2004, 14(3): 186-201.* www.Gotoast.com, various pages, Apr. 2, 2003, accessed using www.archive.org.* www.ppcmanagement.com/features.htm, Dec. 8, 2002, accessed using www.archive.org.* www.gotoast.com various pages www.archive.org verified 2002-2003.*

* cited by examiner

Rules Wizard - Microsoft Internet Explorer

File  Edit  View  Favorites  Tools  Help

← Back →  [X]  [$]  ☆ Favorites  ☐ Media  ○  🖨

Select A Rule

[ Back ]                                                              [ Next ]

Manage Search Term Position Based On:

○ Timed Rank
   Changes the position of your listing based on time of day.
○ First Gap
   Moves your listing to the first gap.
○ Largest Gap
   Moves your listing to the largest gap.
○ Bidding War Eliminator
   Moves your listing to position "x" when the additional cost is less than or equal to "y" cents (eliminates competitive bid ratcheting).
○ First Gap Range
   Moves your listing to the first gap greater than or equal to "x" in the top "y" results.
○ Largest Gap Range
   Moves your listing to the largest gap greater than or equal to "x" in the top "y" results.
○ Time Zone
   Moves your listing to "x" position between "y" start time and "z" end time.
○ Delayed Start
   Executes updates only after "x" start time.
○ Price Differential
   Moves your listing only if the price differential to reach the desired position is larger than "x" from current price, after "y" start time.
○ Timed Price Differential
   Moves your listing only if the price differential to reach the desired position is larger than "x" from current price, after "y" start time.
○ Relative Listing
   Moves your listing above ro below a specified competitor or friendly URL.
○ Max Bid Gap Jammer
   Moves your max bid listing to one cent below your competitor's listing.
○ Last Place Bid
   Moves your listing to last place.
○ Timed Bid
   Changes the bid of your listing based on time of day.
○ Don't Jam Me
   When a competitor is jamming you, moves your listing below that competitor.
○ Budget Manager
   Lowers your keyword phrase bid based on a pre-set daily budget.
○ ROAS Bid Strategy
   Changes the bid based on keyword phrase Return on Advertising Spend (ROAS) statistics gathered from ProfitBuilder ROI.

Done                                                          ○ Internet

*FIG. 4*

SYSTEM FOR MANAGING BIDS FOR PAY-PER-CLICK SEARCH ENGINES

RELATED APPLICATIONS

This patent application claims priority from U.S. Provisional Patent Application Ser. No. 60/462,376 that was filed on Apr. 11, 2003, entitled "RULES-BASED SYSTEM FOR DYNAMICALLY CHANGING BIDS FOR PLACEMENT IN INTERNET PAY-PER-CLICK SEARCH ENGINES", the entire disclosure of which is incorporated herein by reference.

FIELD OF THE INVENTION

The present invention relates generally to pay-per-click search engines and, in particular, to managing the keywords designated by advertisers for use in connection with pay-per-click search engines.

BACKGROUND OF THE INVENTION

Search engines are tools for enabling Internet users to locate websites of interest. While an enormous volume of information is available over the Internet, effective use of such information depends on the availability of powerful search engines to enable users to easily locate resources of interest. The development and availability of such search engines in turn depend on economic modes that provide an incentive to search engine providers. Because users are often reluctant to pay to use search engines, such economic models generally are based on advertising revenues. In many cases, a search engine interface is provided in connection with a portal or other high traffic site for user convenience and to increase search engine usage. In such cases, sharing of advertising revenues may be governed by agreement between the search engine provider and the hosting site provider. In any case, the revenues that support search engine commercialization are generally based directly or indirectly on advertising revenues.

Generally, to use a search engine, the user enters a certain search word or phrase ("keyword") related to a topic of interest. Thus, for example, a user interested in researching homes for sale in Denver, Colo. might enter the keyword "Denver Real Estate." The search engine then executes certain logic to identify and provide a list of sites potentially of interest to the user, generally with excerpted information from those sites to enable the user to quickly determine if the site is of interest. If a site is of interest, the user may click on a link associated with the search results to access the associated website. Such hits are of significant value to website operators. When general or common words are used in connection with the search request, many relevant results may be identified such that the resulting list may extend over several pages.

Generally, some set of rules is executed by the search engine logic to determine a priority of each relevant site so as to develop a sequence for listing the results. For example, the rules may determine a relevance value for each site based on how well the search terms are matched, how many of the search terms are matched, how prominently the search terms are matched, etc. The results may then be displayed to the user in order of relevance.

More recently, the pay-per-click ("PPC") model for Internet search engines was introduced, also known as the "Pay for Performance" or Cost per Click." The PPC model allows advertisers to influence the ranking of their websites in search engine results based on the amount of money they are willing to pay for a click from an end user on their web link ("URL") as shown in the search results. Generally, the more money an advertiser is willing to pay per click for a certain keyword, the higher ranking on the pay-per-click search engine ("PPCSE") for the keyword in question. That is, the advertiser who has placed the highest bid for a keyword will generally be listed first in search results responsive to that keyword. Because being listed first or at least early in search results, e.g., on the first page of results, greatly increases the likelihood of generating a hit, advertisers are often willing to commit considerable resources to such bidding systems.

The click-costs are paid to the search engine provider and are usually passed on in part to so-called distribution partners such as the above-noted high traffic websites that incorporate certain search technology from the PPCSE. The high traffic that these distribution partners generate usually means that many searches will be conducted on the distribution partner's site as well. The search results are provided by the PPCSE and are shown on the distribution partner's website. The distribution partner is usually paid a fee that is a portion of the click-costs in recognition of the fact that the end users performing the search usually click on one or more links that are displayed in the search results.

Each time an end-user clicks on a link displayed in a search result listing, the advertiser associated with the link that was clicked on must pay the click-cost associated with the keyword or key-phrase to the PPCSE. This is in most cases done by debiting an account of the advertiser maintained by the PPCSE each time the end-user clicks on the advertiser's link in the search results. That link usually takes the end-user to the advertiser's web site. The balance is lowered by the amount of money ("bid price") that an advertiser bid for the keyword as of the time the end-user clicked on the link associated with the keyword in question.

Over time, search engines have adopted the PPC model, or new search engines have been founded that from inception used the PPC model. Some search engines include variables other than cost that would influence ranking, such as 'relevance', but in general, most PPCSEs use very similar models that allow their advertisers to influence their rankings for each keyword that is advertised.

All of the "bidding" (the process of establishing and re-evaluating what price should be paid for each keyword in an account on a PPCSE and modifying the per-click-cost in order to outbid competitors or obtain savings by lowering the keyword bids) was initially done by hand by the advertiser on each PPCSE of interest and individually for each keyword advertised. Over time it became clear that in order to be effective at this process of bidding for keywords, one must have the ability to automate certain aspects of this process, since the amount of work to maintain a large number of keywords on a variety of search engines becomes very time consuming.

In order to be more effective with time and resources, advertisers have a choice of various products and services that perform bid management. Conventionally, bid management has generally been limited to modifying the pay-per-click bids for each keyword in order to:

1. Obtain the desired ranking in the PPCSE for the keyword in question in case the ranking has changed as a result of a competitor bidding more for the same keyword. Example: Advertiser A wants to be in the second position, but is currently in third. The first position has a bid price of $0.25, the second position has a bid price of $0.20, and the third position has a bid price of $0.19. In order for Advertiser A to be listed in second position, he must set the price per click for the keyword to at least $0.21. The competitor that paid $0.20 per click would then be in third position.

2. Decrease the bid amount for the keyword in question because the competitive landscape has changed allowing someone to decrease their bid while maintaining the same position. Example: Advertiser B wants second position and is currently listed in second position. The first position has a bid price of $0.25 per click, the second position has a bid price of $0.20, and the third position has a bid price of $0.15. Changing the bid for second position to $0.16 maintains the same ranking while paying less per click.

There are various products and services available that will allow an advertiser to automate these bid management aspects of keyword management for a PPCSE. Usually, bid management products or services allow an advertiser to set up a desired ranking and a maximum price the advertiser is willing to pay to obtain the desired ranking.

These bid management products generally attempt to obtain the desired ranking for the keyword in question at a pre-defined interval (e.g. once an hour, once a day, etc) while not exceeding the maximum price. Typically, if the maximum price would be exceeded in order to obtain the desired ranking, the bid management software will find the next best position that will not exceed the maximum price.

Some bid management products and services are also capable of eliminating so called "bid gaps". Bid gaps are situations where the amount of money advertisers are paying are not sequential, for example: first place is paying $0.25 per click, second place is paying $0.24, and third place is paying $0.20. The gap of $0.04 between second and third place is called a bid gap, since the advertiser in second place could be paying $0.21 to maintain the same ranking. Some bid management software will automatically detect this situation and optimize the second place keyword's price to $0.21 to maintain the same ranking.

SUMMARY OF THE INVENTION

It has been recognized that conventional bid management systems may result in inefficient bid management in some cases. In particular, although bids are adjusted periodically, the bid parameters of the current systems are generally static. As a result, advertisers may have to frequently monitor their keyword positions and adjust their maximum prices to achieve the desired rankings. This is particularly true where the keywords are highly competitive. In such cases, bids change frequently and bid prices can be high. Consequently, failure to monitor bids on a regular basis may result in failure to achieve the desired advertising objectives. Moreover, individually managing bids for multiple search engines is cumbersome and inefficient.

In addition, current bid management systems may not provide flexibility sufficient to execute the strategies or achieve the return on investment desired by some advertisers. For example, some companies may desire the flexibility to mimic a more full range of human bidding behavior by automated means. Such bidding behavior may involve factors such as establishing a position in relation to a competitor or friendly party, avoiding bidding war behaviors, and identifying perceived value positions, not merely pursuing an absolute rank. In addition, advertisers may desire to dynamically manage bidding depending, for example, on when phone operators are available to field calls or take orders. Moreover, advertisers may benefit from automated analysis of return on investment and intelligent bidding management based on such analysis.

In accordance with one aspect of the present invention, a method and apparatus (collectively "utility") is provided for enabling centralized management of bidding with respect to multiple pay-per-click search engines. In this regard, a platform is provided for managing bids by advertisers related to influencing rankings of advertiser links in search results of a plurality of pay-per-click search engines. The bids are managed based on one or more bidding parameters to determine ranking information. A first network interface is established by which advertisers can access the platform to enter information related to the bidding parameters. A second network interface allows for communication of portions of the ranking information from the platform to a plurality of pay-per-click search engines. In this manner, a central location, such as a website, is provided by which advertisers can directly manage bids for keywords relative to multiple search engines.

In accordance with another aspect of the present invention, a utility is provided that allows advertisers to manage bids for pay-per-click search engines based on a time parameter. Various types of time parameters may be used in this regard. For example, an advertiser may activate a bid only at certain times of the day/days of the week or may change a maximum price, desired ranking or other parameter based on time of day or other time criteria. Alternatively, the time parameter may establish a delayed start for a bid, establish intervals at which bids may be changed or otherwise associate time information with a bid. The associated utility involves providing a bid management platform, receiving a time parameter related to a bid, and establishing ranking information using the time parameter. It will be appreciated that the use of such time parameters provides significant flexibility for efficient management of pay-per-click search engine bids.

In accordance with a further aspect of the present invention, a utility is provided for establishing a bid for a pay-per-click search engine independent of absolute rank. In this context, a bid identifies a set of parameters by which a price per click for an advertiser is established. Conventionally, bid management systems have included a desired absolute rank, i.e., first, second, third, etc., together with a maximum price. In accordance with the present invention, a bid may be established independent of such an absolute rank. For example, an advertiser may specify a bid price selected based on the first available gap, the largest gap or other information related to the spacing or pattern of existing bids independent of absolute rank. Alternatively, an advertiser may specify a position within search results in relation to a competitor or friendly party without specifying absolute rank. In this manner, a variety of competitive bidding behaviors can be implemented.

In accordance with a still further aspect of the present invention, a utility is provided for managing bids for one or more pay-per-click search engines based on a return on investment parameter. The utility involves tracking expenses incurred as a result of hits on a subject advertiser's link, tracking sales amounts generated as a result of pay-per-click advertising, and dynamically adjusting a bid price based on the tracked expenses and sales to optimize a return on investment. Such optimization may be based on theoretically or empirically derived algorithms, trial and error analysis of preceding adjustments or heuristic engines for learning patterns related to optimization of return on investment.

Based on the foregoing, it is an objective of the present invention to provide a system in which advertisers on PPCSEs can manage keywords in multiple PPCSEs from one central place to be more efficient with time spent on managing all accounts on these PPCSEs, where the bid management system automatically modifies bids for keywords in each supported PPCSE based on parameters set by the advertiser.

It is a further objective of the present invention to provide a system in which advertisers on PPCSEs can set parameters in an administrative screen such as desired ranking in each PPCSE for each keyword and set a maximum price that the advertiser is willing to pay for each keywords in each PPCSE, so that the bid management system may use these settings as default settings for each keyword in case the advertiser does not want to make use of the rules based bidding system as described below.

It is a further objective of the present invention to provide a system that allows the advertiser to activate a keyword in the bid manager administrative screen so that the bid management system may manage the keyword in the PPCSE in question and to allow the advertiser to de-activate a keyword in the bid manager administrative screen, so that the bid manager will ignore the keyword in question for the selected PPCSE and not perform any actions as a result.

It is a further objective of the present invention to provide a system that allows the advertiser to select one or more from a number of pre-defined rules that can be used individually or combined to establish certain strategies or tactics with regard to keyword bid management. These rules implement certain behaviors that are designed around variables that advertisers use to decide on keyword bidding strategies, such as keyword pay-per-click price, time of day, day of week, competitor behavior, bid gaps, etc.

Additional objectives and corresponding advantages of the present invention will be understood from the description below.

BRIEF DESCRIPTION OF THE DRAWINGS

For a more complete understanding of the present invention and further advantages thereof, reference is now made to the following Detailed Description, taken in conjunction with the drawings in which:

FIG. 2 illustrates a user interface screen that may be used in implementing a pay-per-click management system in accordance with the present invention;

FIG. 4 illustrates a window screen for allowing selection from a menu of predefined rule types in accordance with the present invention.

DETAILED DESCRIPTION OF THE INVENTION

In the following description, the invention is set forth in the context of a web-based tool for allowing user directed management of bids for multiple keywords on multiple PPCSEs. Various examples of rules based bidding are also described. While this is believed to represent a particularly advantageous implementation of the invention, it will be appreciated that various aspects of the invention are applicable in other contexts and many other rules may be implemented in accordance with the present invention.

Figure 1:
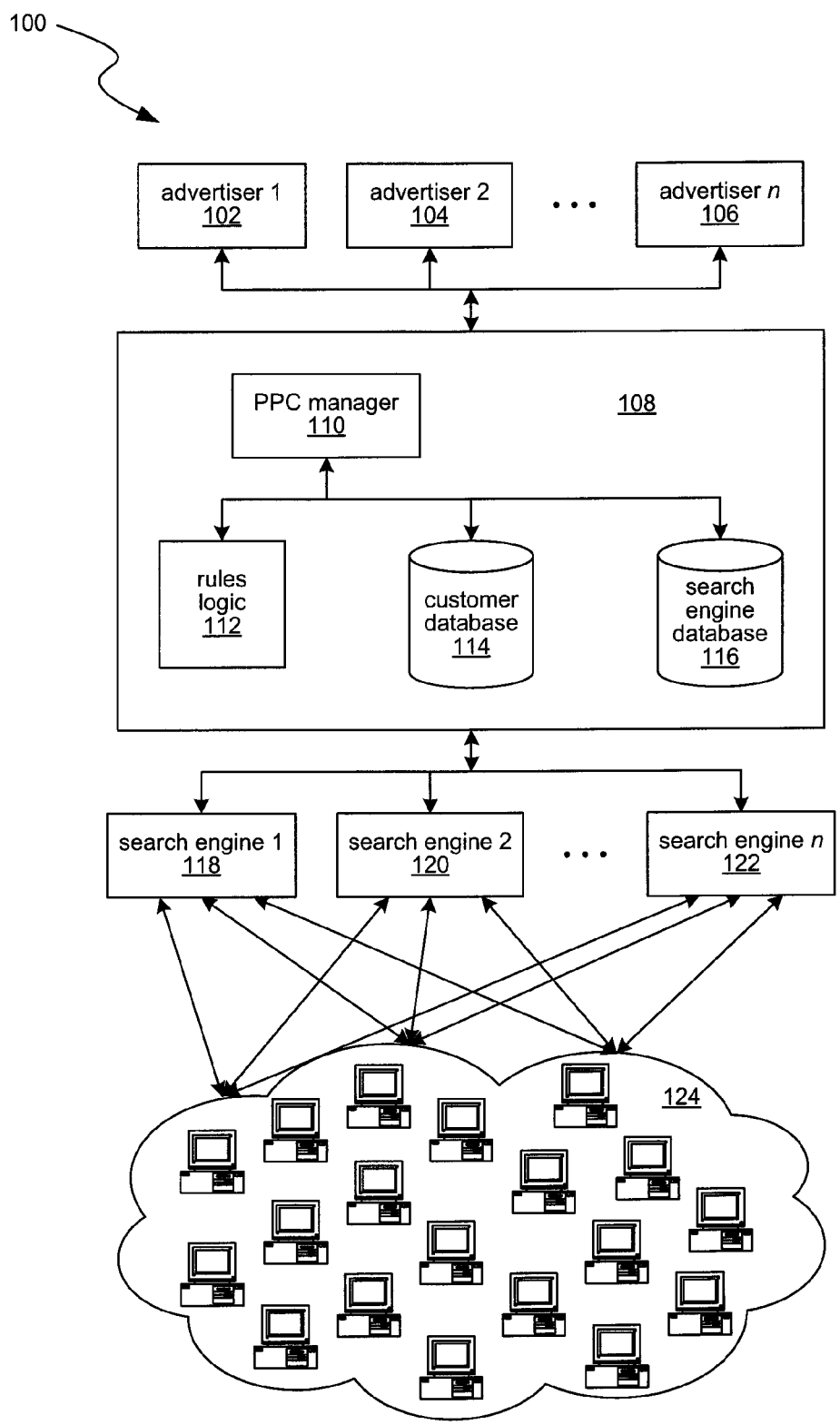
FIG. 1 is a schematic diagram of a network implementing a PPC management system in accordance with the present invention.

FIG. 1 illustrates a network 100 for implementing a PPC management system 108 in accordance with the present invention. The illustrated network 100 involves a number of advertiser nodes 102, 104 and 106 and a number of search engine nodes 118, 120 and 122 that service network user nodes 124, directly or via partners as discussed above. The system 108 allows the advertisers 102, 104 and 106 to efficiently manage their pay-per-click bids for the various search engines 118, 120 and 122. As shown, the system 108 interfaces with each of the search engines 118, 120 and 122 so as to provide a central platform such that the advertisers 102, 104 and 106 do not need to individually interface with the search engines 118, 120 and 122 to manage the bidding processes. Moreover, as will be discussed in more detail below, the system 108 supports a variety of automatic and dynamically variable rule functionality for bid management so as to more efficiently manage the bidding processes.

As shown, the system 108 includes a PPC manager 110 for implementing such logic. In this regard, the manager 110 provides convenient user interfaces for enabling the advertisers to define, select and implement the desired bidding rules. The manager 110 is further operative for executing rules logic 112 during run time to dynamically execute the desired rules. In this regard, the manager 110 can access advertiser specific information 114 that stores information for specific advertisers including selected rules and rule parameter information such as time dependent rules, search engine dependent rules, price limitations, desired rank and the like. The manager also accesses search engine related information 116 which may include various information specific to particular search engines such as current bids for particular ranks, account balances and the like.

Figure 2:
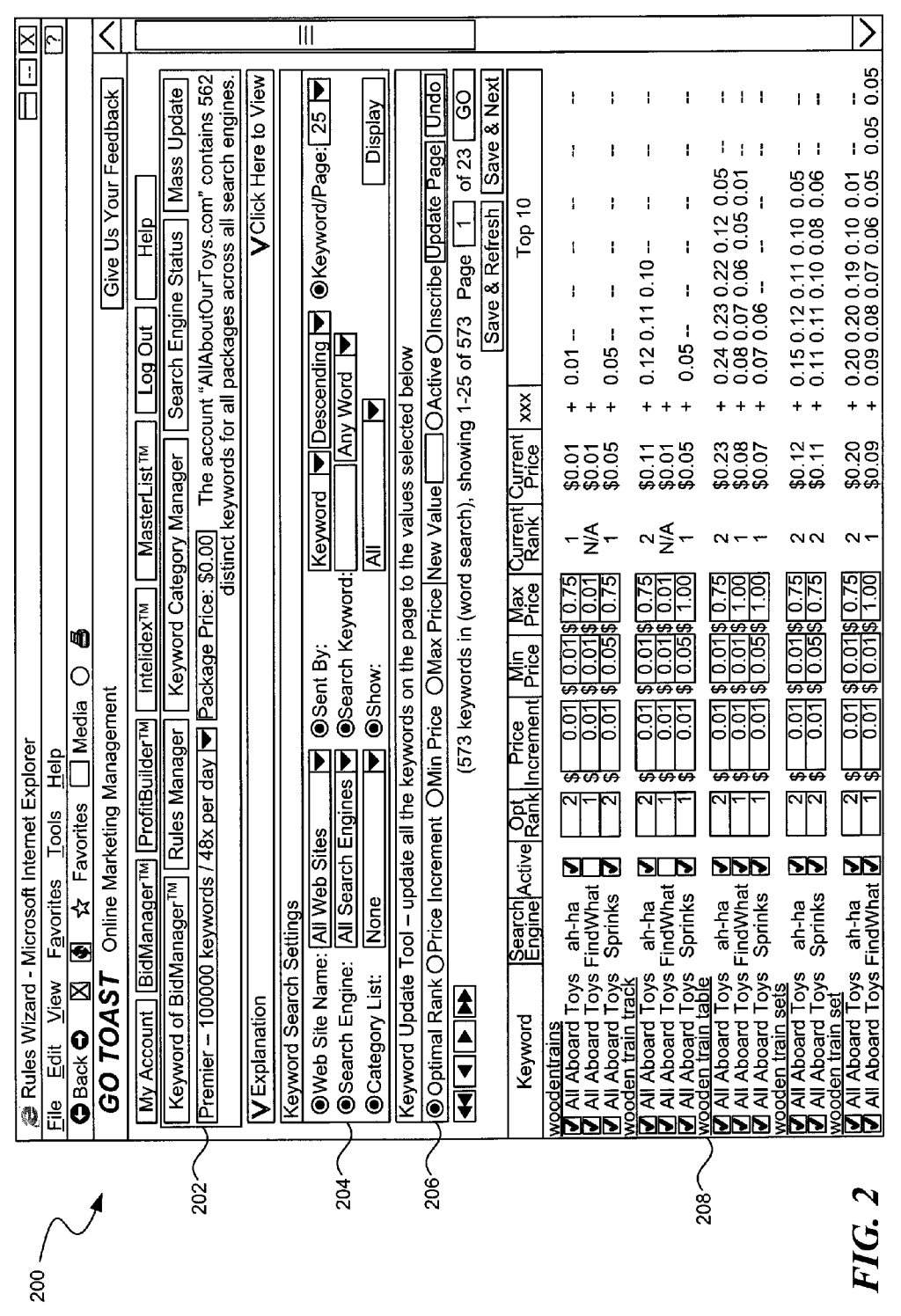

FIG. 2 illustrates an example of a user interface screen 200 that may be used in implementing the pay-per-click management system of the present invention. The screen 200 may be displayed, for example, to advertisers in connection with accessing the above-noted system. The screen 200 illustrates a number of features of the invention. First, the illustrated screen 200 includes a customer package selection window 202. This window 202 may be used to select from a variety of predefined package offerings. For example, the different packages may allow an advertiser/customer to select a different number of keywords for which bidding may occur, or to select a different frequency at which such bids will be updated in accordance with the customer selected bid parameters. The costs of the packages may reflect the level of service provided in this regard. The illustrated screen 200 also includes a keyword search settings window 204. This window 204 may be used by an operator to manage current bid settings. In this regard, the operator can quickly access information regarding bid settings based on the advertiser, the keyword, the search engine or various other parameters of the bid for efficient bid management.

Figure 3:
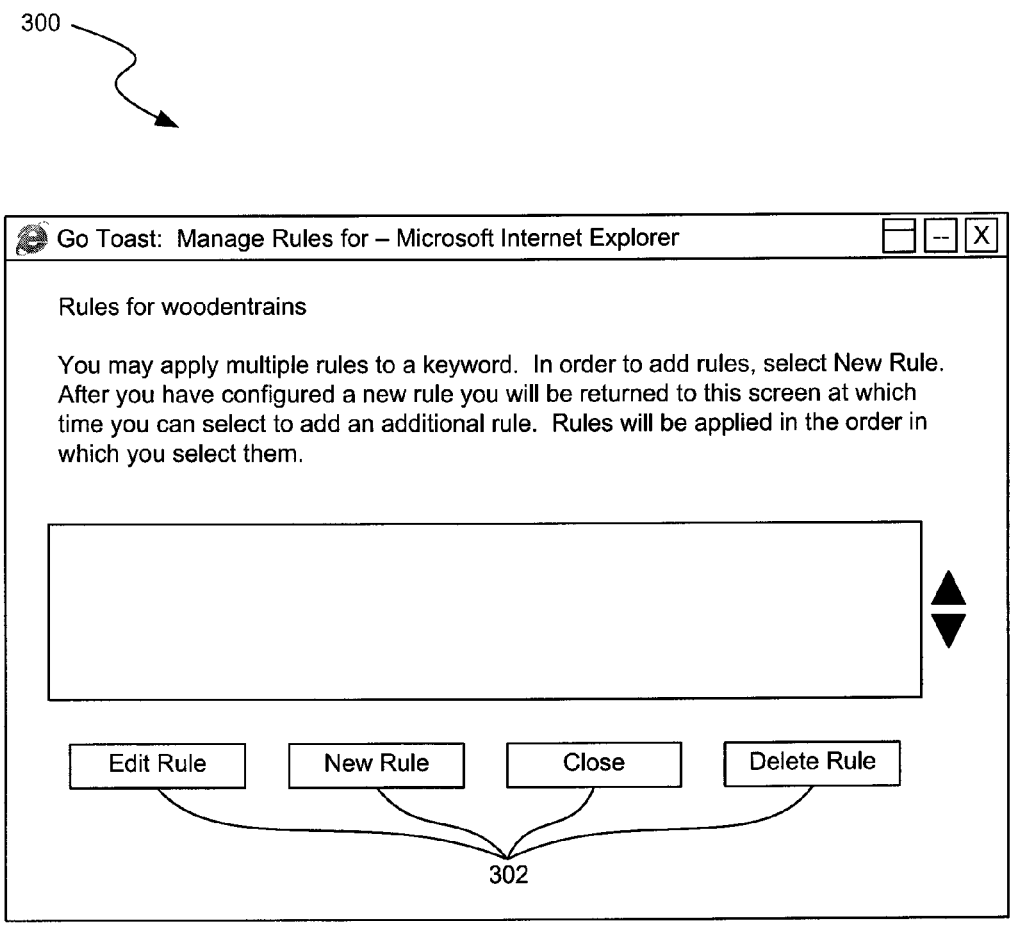
FIG. 3 illustrates a user interface screen that may be used to define rules for a keyword to be managed in accordance with the present invention.

The keyword update tool window 206 provides a convenient mechanism for updating bid parameters. In particular, individual bids may be updated using this window 206 to select an optimal rank for a keyword on a given search engine, to change a price increment, to set or update a minimum price or a maximum price or to remove a keyword from active status. The current status of keyword parameters is shown in window 208. For example, this advertiser has selected an optimal rank of 2 for the keyword "All Aboard Toys" on the search engine ah-ha. As shown, the advertiser has currently obtained that rank with a bid of $0.23' per click. Other advertisers have bids for that keyword on that search engine ranging from $0.05 to $0.24 per click. FIG. 3 illustrates a screen that may be used to define rules for a keyword such as "woodentrains". As explained in the window, multiple rules may be applied for a keyword. The user can use the button 302 to edit existing rules, select new rules, delete existing rules or to close out of the window.

Upon selecting the New Rule button, the user may be presented with window 400 of FIG. 4 including a menu of predefined rule types. These include the following:

1. Timed Rank. This rule allows the advertiser to change the position of the advertiser's listing on a search results page based on time of day. In this manner, an advertiser may choose to reduce its pay-per-click bid, and the associated ranking, at times of the day when the advertiser is not available by phone or otherwise deems site hits to be less valuable.
2. First Gap. This rule allows an advertiser, to move its bid to the first available gap in bid prices which may be perceived as providing greater return on investment. A bid gap is a gap in pay-per-click pricing for a complete listing on a PPCSE for a single keyword. For example: if the first position for the keyword "sunflower" pays $0.23, the second position pays $0.22, and the third position pays $0.18, this means that there is a bid gap between second and third position since pay-per-click costs for these two positions are more than $0.01 apart. The 'First Gap' rule would place the keyword in third position at $0.19. The first bid gap rule may be subject to a maximum number of rankings that will be reviewed (e.g. only review top 5 or top 10 listings). The additional maximum number of rankings to review is defined by the advertiser.
3. Largest Gap. This rule allows an advertiser to adjust its bid to target the largest gap in the list of bids, which again may be perceived by certain advertisers as providing the best return on investment. The largest gap rule will pick out the largest gap and attempt to modify the keyword's ranking to the bottom end of the largest gap. The largest bid gap rule may be subject to a maximum number of rankings that will be reviewed (e.g. only review top 5 or top 10 listings). The additional maximum number of rankings to review is defined by the advertiser.
4. Time Zone. This rule allows an advertiser to select an optimal rank position within a defined time frame.
5. Delayed Start. This rule results in execution of updates only after a predefined start time which may allow the competitive bidding to settle.
6. Price Differential. This allows an advertiser to change its bid only if the price differential to reach the desired position is larger than the predefined amount from a current bid price. This may be used by an advertiser, for example, to prevent frequent incremental bid changes that may fuel bidding wars. For example, when the price differential is set to $0.03, the bid manager will not attempt to improve the ranking of the keyword until the price difference between current and desired ranking is at least $0.03 apart.
7. Time Price Differential. This rule includes elements of the Delayed Start and Price Differential rules noted above. In this regard, an advertiser may choose to delay execution to let the competitive bidding process settle and then postpone bid adjustments until a sufficient price differential is achieved so as to avoid frequent incremental adjustments.
8. Relative Listing. This rule allows an advertiser to set its bid price relative to an identified competitor or friendly URL rather than based on absolute price or ranking criteria. The advertiser can set a competitor's URL (Uniform Resource Locator, the web address of the competing advertiser), whether the desired ranking is above or below the competitor's URL and how many positions the desired ranking is above or below the competitor's URL. The bid manager will always attempt to place the keyword in the desired position pre-defined by the advertiser.
9. Max Bid Gap Jammer. This rule sets a bid to $0.01 below that of a competitor so as to not leave a bid gap that could be used by another competitor to reduce the advertiser's rank. A certain PPCSE may have a system in place in which position is maintained exclusively by the maximum amount someone would be willing to spend per click on a keyword to be listed. For example: an advertiser in third rank may set the maximum cost on a PPCSE for a keyword to $0.15. The advertiser in second rank may set the maximum cost on PPCSE for same keyword to $0.25, but may actually be paying $0.16 ($0.01 over the maximum cost of advertiser in third rank). The advertiser in first rank in this example may have set the maximum cost on PPCSE for same keyword to $1.00, but may actually be paying $0.26 per click, since that is $0.01 over the maximum the advertiser in second rank is willing to spend per click. The 'Maximum Bid Gap Jammer' rule would, if deployed by the advertiser in the second rank, set the maximum cost per click to $0.99, so that the advertiser in first rank is actually forced to pay the $1.00 per click rather than the previous $0.26. The advertiser in the second rank would continue to pay $0.16, since the actual cost per click is dependent on what the advertiser in the next lower rank has set as their maximum bid+$0.01.
10. Last Place Bid. This rule moves the advertiser's listing to last place. This may be used, for example, to incur minimum expense during low value time periods or to achieve pay-per-click advantages relative to non-paying advertisers at minimum expense.
11. Timed Bid. This rule allows an advertiser to change its bid for particular keywords based on time of day as discussed above.
12. Don't Jam Me. This rule can be used to identify when a competitor is pricing its bid just below the advertiser's. For example, this rule may be used to prevent a particular competitor from tracking the advertiser's bids or to otherwise prevent a competitor from obtaining a beneficial ranking or pricing. This rule allows for the system to detect when jamming occurs and offers a way to avoid those situations in which the advertiser has to pay excessive per click costs for a certain keyword. The parameters the advertiser has to define are:
    a. Jamming gap: the gap amount between the advertiser's ranking and the next ranked competitor for the system to treat the situation as jamming by a competitor. Usually set at $0.01.
    b. Minimum gap size: The gap to move to in case a competitor is jamming. The system will try to find a gap in the ranking for that keyword that is at least as big as the parameter indicates and move to the bottom of the gap.

c. Lowest rank: The minimum acceptable ranking when the system is counteracting jamming from competitors. If the anti-jamming action would result in $7^{th}$ position, but the lowest rank is set to 5, the rule is not applicable and the bid manager will either evaluate the next rule or use the default bid parameters.

13. Budget Manager. This rule allows an advertiser to manage its bids based on a preset daily budget rather than in terms of absolute pricing or ranking. Using this rule, the advertiser can set a maximum total click through cost per day to be allowed for a single keyword. As soon as the keyword has reached the maximum accumulated click through cost for the day, the keyword will be set to a maximum bid amount that is pre-defined by the advertiser. The advertiser can define whether to apply this rule to a single PPCSE or to all PPCSEs on which the bid manager manages the keyword in question.

14. ROAS Bid Strategy. This allows an advertiser to manage bids based on a Return on Advertising Spent parameter rather than on absolute pricing or ranking. ROAS stands for "Return On Advertising Spent", which indicates for each dollar spent on pay-per-click ("PPC") advertising, how much revenue is generated. Through Return On Investment ("ROI") tracking features, it is possible to track the sales amount generated on a web site as a result of PPC advertising. This ROI data combined with data from the bid management system (cost per click specifically) can be used to feed one of the rules in the rules manager which then automatically can adjust desired ranking in the PPCSEs. The desired rank adjustment is generated by an algorithm which analyzes the available data (ROI and click-cost data) and weighs it against the objective. The parameters that need to be defined by the advertiser for each keyword are:

a. Monthly User Session Minimum for rule to Apply: The number of clicks received for this keyword for the last 30 days for the rule to be applied. Until the Session Threshold Minimum is met, bids will be adjusted based on the Maximum Price set in the Keyword Manager System and the ROAS Bid Strategy Rule will not be applied. This is to prevent data that is from a sample that is too small to analyze to affect the keyword bidding strategy adversely.
   b. Target ROAS: The ROAS when the keyword phrase becomes profitable for the advertiser's business (or another desired profitability target). The Target ROAS may be adjusted up as keyword phrase performance improves.
   c. Not To Exceed ROAS Max Price: The ROAS Bid Strategy Rule Max Price that should not be exceeded. As the keyword phrase ROAS improves, the ROAS Bid Strategy Rule may override the Maximum Price that is set in the Keyword Manager System. The ROAS Bid Strategy Rule is the ONLY rule that may override the Maximum Price set for each keyword in the Keyword Manager System.

It will be appreciated that many other rules are possible and the management system of the present invention allows development of custom rules and rule combinations.

Figure 5:
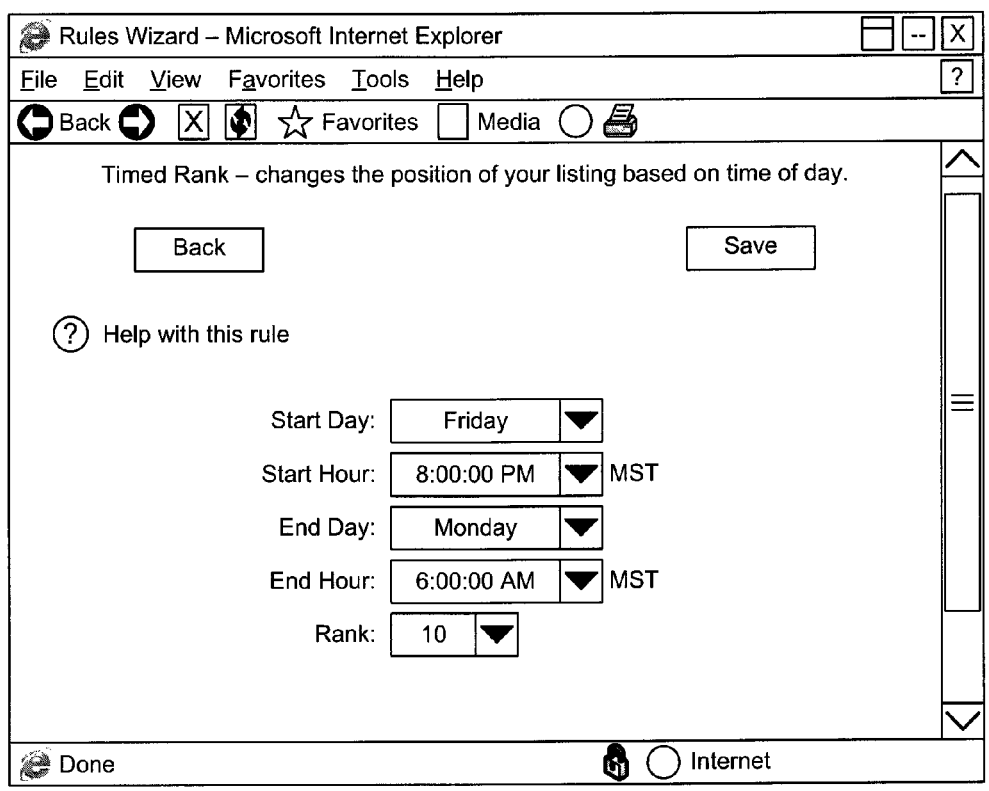
FIG. 5 illustrates a user interface screen for allowing an advertiser to set particular parameters based on time of day or day of week in accordance with the present invention.

It will be appreciated that appropriate user interface screens may be provided for implementing each of these rules. FIG. 5 illustrates a screen 500 that allows an advertiser to set particular parameters based on time of day or day of the week. For example, this screen may be displayed when the advertiser selects the Timed Rank button (FIG. 4). As shown, the screen 500 includes windows for selecting start times and end times and start days and end days for a particular bid for a particular keyword and, in this case, the optimal rank. The screens provided in connection with other rules would allow the advertiser, to enter the relevant parameter information for those rules.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. An internet-based apparatus comprising a processor, memory, a first network interface communicatively coupling the apparatus to advertisers over the internet, and a second network interface communicatively coupling the apparatus to a plurality of pay-per-click search engines over the internet, the apparatus being configured to perform a method for managing bids for the pay-per-click search engines, the method comprising:

receiving, over the internet at the first network interface, a selection of a keyword from a first advertiser and a bidding strategy for placing advertisements on each of the plurality of pay-per-click search engines when the keyword is used as a search term at the pay-per-click search engines, the bidding strategy including a target advertising revenue;
   tracking advertising revenue of the first advertiser;
   determining whether to apply the bidding strategy based on a number of user actions received for the keyword at the pay-per-click search engines;
   responsive to the determination to apply the bidding strategy, generating a plurality of bids for placing advertisements of the advertiser in association with the keyword at each of the pay-per-click search engines, the bid management system simultaneously communicatively coupled to each of the pay-per-click search engines, the generation of the bids comprising:
      selecting a bid amount based on the tracked advertising revenue and the target advertising revenue,
      responsive to determining a second advertiser has placed a bid less than a threshold amount below the selected bid amount in a first one of the pay-per-click search engines, reducing the selected bid amount to a first reduced bid amount based on the bid placed by the second advertiser, and
      responsive to determining a third advertiser has placed a bid less than a threshold amount below the selected bid amount in a second one of the pay-per-click search engines, reducing the selected bid amount to a second reduced bid amount based on the bid placed by the third advertiser, the second reduced bid amount different from the first reduced bid amount;
   sending the first reduced bid amount to the first one of the pay-per-click search engines over the internet via the second network interface, the first one of the pay-per-click search engines configured to adjust a ranking of advertisements for the keyword based on the first reduced bid amount; and
   sending the second reduced bid amount to the second one of the pay-per-click search engines over the internet via the second network interface, the second one of the pay-per-click search engines configured to adjust a ranking of advertisements for the keyword based on the second reduced bid amount.

2. The apparatus of claim 1, wherein the bidding strategy further includes a threshold number of user actions for applying the bidding strategy, and wherein determining whether to apply the bidding strategy comprises:
responsive to determining the number of user actions received for the keyword exceeds the threshold number of user actions, applying the bidding strategy.

3. The apparatus of claim 2, wherein the bidding strategy further includes a predefined bid amount, and wherein the method further comprises:
responsive to the number of user actions received for the keyword being less than the threshold number of user actions, sending the predefined bid amount to the plurality of pay-per-click search engines.

4. The apparatus of claim 1, wherein the bidding strategy further includes a time parameter for the bids, and wherein the bid amount is selected based further on the time parameter.

5. The apparatus of claim 4, wherein the time parameter specifies a rank of the first advertiser at each of the plurality of pay-per-click search engines at two or more times of day, and wherein the bid amount is selected to achieve the specified rank at the respective time of day.

6. The apparatus of claim 4, wherein the time parameter specifies an amount of time to delay bidding by the first advertiser after bidding by other advertisers has started at the pay-per-click search engines, and wherein the bid amount is selected after the specified amount of time.

7. The apparatus of claim 1, wherein the bidding strategy further includes a maximum bid amount, and wherein sending the first reduced bid amount to the first one of the pay-per-click search engines comprises:
responsive to the first reduced bid amount for the pay-per-click search engine being less than the maximum bid amount, sending the first reduced bid amount to the first one of the pay-per-click search engines; and
responsive to the first reduced bid amount for the first one of the pay-per-click search engines being greater than the maximum bid, sending the maximum bid amount to the first one of the pay-per-click search engines.

8. The apparatus of claim 1, wherein reducing the selected bid amount to the first reduced bid amount comprises reducing the selected bid amount to a lower end of a gap between the selected bid and the bid of the second advertiser.

9. A method for managing bids for placing advertisements on a plurality of pay-per-click search engines at an internet-based bid management system, the method comprising:
receiving, over the internet at a first network interface of the bid management system, a selection of a keyword from a first advertiser and a bidding strategy for placing advertisements on the plurality of pay-per-click search engines when the keyword is used as a search term at the pay-per-click search engines, the first network interface communicatively coupling the bid management system to the first advertiser over the internet, the bidding strategy including a target advertising revenue;
tracking advertising revenue of the first advertiser;
determining whether to apply the bidding strategy based on a number of user actions received for the keyword at the pay-per-click search engines;
responsive to the determination to apply the bidding strategy, generating by the bid management system, a plurality of bids for placing advertisements of the advertiser in association with the keyword at each of the pay-per-click search engines, the bid management system simultaneously communicatively coupled to each of the pay-per-click search engines, the generation of the bids comprising:
selecting a bid amount based on the tracked advertising revenue and the target advertising revenue,
responsive to determining a second advertiser has placed a bid less than a threshold amount below the selected bid amount in a first one of the pay-per-click search engines, reducing the selected bid amount to a first reduced bid amount based on the bid placed by the second advertiser, and
responsive to determining a third advertiser has placed a bid less than a threshold amount below the selected bid amount in a second one of the pay-per-click search engines, reducing the selected bid amount to a second reduced bid amount based on the bid placed by the third advertiser, the second reduced bid amount different from the first reduced bid amount;
sending, over the internet at a second network interface, the first reduced bid amount to the first one of the pay-per-click search engines, the first one of the pay-per-click search engines configured to adjust a ranking of advertisements for the keyword based on the first reduced bid amount, the second network interface communicatively coupling the bid management system to the pay-per-click search engines over the internet, and
sending, over the internet at the second network interface, the second reduced bid amount to the second one of the pay-per-click search engines, the second one of the pay-per-click search engines configured to adjust a ranking of advertisements for the keyword based on the second reduced bid amount.

10. The method of claim 9, wherein the bidding strategy further includes a threshold number of user actions for applying the bidding strategy, and wherein determining whether to apply the bidding strategy comprises:
responsive to determining the number of user actions received for the keyword exceeds the threshold number of user actions, applying the bidding strategy.

11. The method of claim 10, wherein the bidding strategy further includes a predefined bid amount, and wherein the method further comprises:
responsive to the number of user actions received for the keyword being less than the threshold number of user actions, sending the predefined bid amount to the plurality of pay-per-click search engines.

12. The method of claim 9, wherein the bidding strategy further includes a time parameter for the bids, and wherein the bid amount is selected based further on the time parameter.

13. The method of claim 12, wherein the time parameter specifies a rank of the first advertiser at each of the plurality of pay-per-click search engines at two or more times of day, and wherein the bid amount is selected to achieve the specified rank at the respective time of day.

14. The method of claim 12, wherein the time parameter specifies an amount of time to delay bidding by the first advertiser after bidding by other advertisers has started at the pay-per-click search engines, and wherein the bid amount is selected after the specified amount of time.

15. The method of claim 9, wherein the bidding strategy further includes a maximum bid amount, and wherein sending the first reduced bid amount to the first one of the pay-per-click search engines comprises:
responsive to the first reduced bid amount for the pay-per-click search engine being less than the maximum bid amount, sending the first reduced bid amount to the first one of the pay-per-click search engines; and responsive to the first reduced bid amount for the first one of the pay-per-click search engines being greater than the maximum bid, sending the maximum bid amount to the first one of the pay-per-click search engines.

16. The method of claim 9, wherein reducing the selected bid amount to the first reduced bid amount comprises reducing the selected bid amount to a lower end of a gap between the selected bid and the bid of the second advertiser.

17. A non-transitory computer readable storage medium storing executable computer program instructions, the computer program instructions when executed by a processor causing the processor to:

receive, over the internet at a first network interface, a selection of a keyword from a first advertiser and a bidding strategy for placing advertisements on a plurality of pay-per-click search engines when the keyword is used as a search term at the pay-per-click search engines, the first network interface communicatively coupling the processor to the first advertiser over the internet, the bidding strategy including a target advertising revenue;

tracking advertising revenue of the first advertiser;

determining whether to apply the bidding strategy based on a number of user actions received for the keyword at the pay-per-click search engines;

responsive to the determination to apply the bidding strategy, generating a plurality of bids for placing advertisements of the advertiser in association with the keyword at each of the pay-per-click search engines, the bid management system simultaneously communicatively coupled to each of the pay-per-click search engines, the generation of the bids comprising:

selecting a bid amount based on the tracked advertising revenue and the target advertising revenue, responsive to determining a second advertiser has placed a bid less than a threshold amount below the selected bid amount in a first one of the pay-per-click search engines, reducing the selected bid amount to a first reduced bid amount based on the bid placed by the second advertiser, and responsive to determining a third advertiser has placed a bid less than a threshold amount below the selected bid amount in a second one of the pay-per-click search engines, reducing the selected bid amount to a second reduced bid amount based on the bid placed by the third advertiser, the second reduced bid amount different from the first reduced bid amount; and sending, over the internet at a second network interface, the first reduced bid amount to the first one of the pay-per-click search engines, the first one of the pay-per-click search engines configured to adjust a ranking of advertisements for the keyword based on the first reduced bid amount, the second network interface communicatively coupling the bid management system to the pay-per-click search engines over the internet, and sending, over the internet at the second network interface, the second reduced bid amount to the second one of the pay-per-click search engines, the second one of the pay-per-click search engines configured to adjust a ranking of advertisements for the keyword based on the second reduced bid amount.

18. The non-transitory computer readable storage medium of claim 17, wherein the bidding strategy further includes a threshold number of user actions for applying the bidding strategy, and wherein the computer program instructions for determining whether to apply the bidding strategy comprise computer program instructions that when executed by the processor cause the processor to:

apply the bidding strategy responsive to determining the number of user actions received for the keyword exceeds the threshold number of user actions.

19. The non-transitory computer readable storage medium of claim 18, wherein the bidding strategy further includes a predefined bid amount, and wherein the computer program instructions further comprise computer program instructions that when executed by the processor cause the processor to:

send the predefined bid amount to the plurality of pay-per-click search engines responsive to the number of user actions received for the keyword being less than the threshold number of user actions.

20. The non-transitory computer readable storage medium of claim 17, wherein the bidding strategy further includes a time parameter for the bids, and wherein the bid amount is selected based further on the time parameter.

21. The non-transitory computer readable storage medium of claim 20, wherein the time parameter specifies a rank of the first advertiser at each of the plurality of pay-per-click search engines at two or more times of day, and wherein the bid amount is selected to achieve the specified rank at the respective time of day.

22. The non-transitory computer readable storage medium of claim 20, wherein the time parameter specifies an amount of time to delay bidding by the first advertiser after bidding by other advertisers has started at the pay-per-click search engines, and wherein the bid amount is selected after the specified amount of time.

23. The non-transitory computer readable storage medium of claim 17, wherein the bidding strategy further includes a maximum bid amount, and wherein the computer program instructions causing the processor to send the first reduced bid amount to the pay-per-click search engines further comprise instructions that when executed by the processor cause the processor to:

responsive to the first reduced bid amount for the pay-per-click search engine being less than the maximum bid amount, sending the first reduced bid amount to the first one of the pay-per-click search engines; and responsive to the first reduced bid amount for the first one of the pay-per-click search engines being greater than the maximum bid, sending the maximum bid amount to the first one of the pay-per-click search engines.

24. The non-transitory computer readable storage medium of claim 17, wherein reducing the selected bid amount to the first reduced bid amount comprises reducing the selected bid amount to a lower end of a gap between the selected bid and the bid of the second advertiser.

* * * * *